(12) United States Patent
Tanberk et al.

(10) Patent No.: US 11,629,414 B2
(45) Date of Patent: Apr. 18, 2023

(54) PROCESS FOR HYDROGEN PRODUCTION

(71) Applicant: TEC ADVANCED ANSTALT, Vaduz (LI)

(72) Inventors: Olgun Tanberk, Vaduz (LI); Tilsim Von Liechtenstein, Vaduz (LI)

(73) Assignee: TEC ADVANCED ANSTALT, Vaduz (LI)

( * ) Notice: Subject to any disclaimer, the term of this patent is extended or adjusted under 35 U.S.C. 154(b) by 710 days.

(21) Appl. No.: 16/660,252

(22) Filed: Oct. 22, 2019

(65) Prior Publication Data
US 2020/0048779 A1 Feb. 13, 2020

Related U.S. Application Data

(63) Continuation-in-part of application No. PCT/EP2017/083134, filed on Dec. 15, 2017.

(30) Foreign Application Priority Data

Apr. 25, 2017 (EP) ..................... 17167999

(51) Int. Cl.
| | |
|---|---|
| C25B 15/08 | (2006.01) |
| C25B 9/19 | (2021.01) |
| C25B 1/04 | (2021.01) |
| C10L 1/12 | (2006.01) |
| C25B 11/04 | (2021.01) |
| C25B 15/00 | (2006.01) |
| F02M 25/12 | (2006.01) |
| C25B 9/23 | (2021.01) |

(52) U.S. Cl.
CPC ............. *C25B 1/04* (2013.01); *C10L 1/1266* (2013.01); *C25B 9/23* (2021.01); *C25B 11/04* (2013.01); *C25B 15/00* (2013.01); *F02M 25/12* (2013.01)

(58) Field of Classification Search
CPC .. C25B 1/04; C25B 1/02; C25B 15/08; C25B 9/19; C25B 15/02; C25B 9/23; C25B 9/00
See application file for complete search history.

(56) References Cited

U.S. PATENT DOCUMENTS

| | | | | |
|---|---|---|---|---|
| 3,444,001 A | * | 5/1969 | Terry | ............... H01M 8/222 |
| | | | | 429/454 |
| 3,506,493 A | * | 4/1970 | Morris | ............... H01M 8/00 |
| | | | | 204/266 |
| 3,520,137 A | * | 7/1970 | Newman | ............... B64G 1/402 |
| | | | | 60/221 |
| 4,384,941 A | | 5/1983 | Okamoto et al. | |

FOREIGN PATENT DOCUMENTS

| | | |
|---|---|---|
| JP | 2014040625 A | 3/2014 |
| WO | 2008061975 A2 | 5/2008 |
| WO | 2009024185 A1 | 2/2009 |
| WO | 2018197032 | 11/2018 |

OTHER PUBLICATIONS

Tang et al., "Energy-Saving Electrolytic Hydrogen Generation: Ni2P Nanoarray as a High-Performance Non-Noble-Metal Electrocatalyst," Angewandte Chemie International Edition, vol. 56, No. 3, Jan. 16, 2017 (Jan. 16, 2017), pp. 842-846.
Liu et al., "Energy-efficient electrolytic hydrogen generation using a Cu3P nanoarray as a bifunctional catalyst for hydrazine oxidation and water reduction," Inorganic Chemistry Frontiers, 2017, 4, 420.
International Preliminary Report on Patentability for International Application No. PCT/EP2017/083134 dated Jul. 29, 2019.
Vasudevan, "Membranes and Diaphragms for Electrochemical Processes (Part—1)," Research Journal of Chemical Sciences, vol. 3 (2), 1-3, Feb. 2013.
Schalenbach,"Acidic or Alkaline? Towards a New Perspective on the Efficiency of Water Electrolysis," Journal of The Electrochemical Society, 163 (11) F3197-F3208 (2016).

\* cited by examiner

*Primary Examiner* — Zulmariam Mendez
(74) *Attorney, Agent, or Firm* — Renner, Otto, Boisselle & Sklar, LLP

(57) ABSTRACT

The present invention relates to a method for manufacturing hydrogen by an improved electrolytic process; to electrolytic cells (electrolyzers) adapted to such a process and to devices comprising such electrolytic cells. The invention further relates to new uses of aqueous hydrazine; particularly as an electrolyte.

12 Claims, No Drawings

PROCESS FOR HYDROGEN PRODUCTION

This application is a continuation-in-part of International Application No. PCT/EP2017/083134 filed Dec. 15, 2017 and published in the English language, which claims priority to European Application No. 17167999.6 filed Apr. 25, 2017, both of which are incorporated herein by reference.

The present invention relates to a method for manufacturing hydrogen by an improved electrolytic process; to electrolytic cells (electrolyzers) adapted to such a process and to devices comprising such electrolytic cells. The invention further relates to new uses of aqueous hydrazine; particularly as an electrolyte.

Hydrogen, particularly hydrogen gas and hydrogen containing gases, are well known and are considered a key element in today's industry and the upcoming hydrogen economy. The efficient manufacturing of hydrogen is of paramount importance.

Current industrial processes for hydrogen manufacturing are based on processing of hydrocarbons, such as natural gas, by cracking or steam reforming. These methods inherently involve CO2 emissions, which are of course disadvantageous.

Processes for hydrogen manufacturing free of CO2 emissions are also known and include electrolysis of water. These methods produce oxygen as an advantageous side-product. Although environmentally clearly favoured, electrolysis of water for manufacturing hydrogen has not reached large scale production, mainly due to cost considerations.

Schallenbach et al (Journal of The Electrochemical Society, 163 (11) F3197-F3208 (2016)) discuss new perspectives on the efficiency of water electrolysis. The document models electrolyzer efficiency and discusses various parameters including electrodes, electrolytes, and operational parameters.

Okamoto et al (U.S. Pat. No. 4,384,941) discloses a process for electrolysis of pure water in an electrolytic cell equipped with specific cation exchange membranes. Bert et al (WO2009/024185) disclose an on-board continuous hydrogen production via ammonia electrolysis, corresponding devices and methods of operating the same. The thus obtained Hydrogen-Nitrogen mixture may be used as a combustion promoter in an internal combustion engine. As outlined in this document (eq. 3) Ammonia is cleaved into nitrogen and hydrogen, using aqueous ammonia in an electrolytic process. Similarly, Bert et al (WO2008/061975) disclose electrodes for the production of hydrogen by the electrolysis of aqueous ammonia. It is speculated about replacing Ammonia by compounds containing NH groups. Again, the authors emphasize that ammonia is cleaved (p. 4), not water. Yamazaki et al (JP2012/0182516) disclose the production of hydrogen starting from an aqueous hydrazine solution. The process involves immersion of cathode and anode pole, said anode comprising a catalytically active coating of metal complexes, the metal complexes containing group (IX) metals and specific ligands. According to this document, examples 1 and 2, the electrolyte comprises an aqueous solution containing 1 mol % hydrazine (equiv. to 3.2 wt. %) and 1 mol % or 0.1 mol % NaOH (equivalent to 4 wt. % or 0.4wt. %). Due to the catalyst present, the reaction occurs spontaneously, without external voltage being applied. As a consequence, the process disclosed is not an electrolytic process but rather a spontaneously occurring catalytic process. Although suitable in the context of research, the anode pole is difficult to manufacture and sensitive in handling therefore preventing commercial applications.

Thus, it is an object of the present invention is to mitigate at least some of these drawbacks of the state of the art. In particular, it is an aim of the present invention to provide a processes to efficiently obtain hydrogen and avoiding CO2 emissions.

These objectives are achieved by an electrolytic process for the manufacture of hydrogen, particularly for the manufacture of hydrogen from water using aqueous hydraziine. The objectives are further achieved by electrolytic cells (electrolyzers) that include a housing: a cathode, the cathode material being selected from titanium and its alloys or plated with titanium and its alloys; an anode, the anode material being selected from titanium and its alloys or plated with titanium and its alloys; an electrolytic composition, the electrolytic composition including water, 0.5-50 wt. % hydrazine, 0-10 wt. % alkali hydroxide and has a pH between 7.5-13; and optionally a diaphragm. The objective are further achieved by an internal combustion engine additive composition, the additive composition including water and 0.5-50 wt. % hydrazine and having a pH of 7.5-13, whereby said composition is first subjected to an electrolytic process and the thus resulting gaseous products are fed to an internal combustion engine. Further aspects of the invention are disclosed in the specification and independent claims, preferred embodiments are disclosed in the specification and the dependent claims.

The present invention will be described in more detail below. It is understood that the various embodiments, preferences and ranges as provided/disclosed in this specification may be combined at will. Further, depending of the specific embodiment, selected definitions, embodiments or ranges may not apply.

As used herein, the term "a", "an", "the" and similar terms used in the context of the present invention (especially in the context of the claims) are to be construed to cover both the singular and plural unless otherwise indicated herein or clearly contradicted by the context. As used herein, the terms "including", "containing" and "comprising" are used herein in their open, non-limiting sense. The term "containing" shall include both, "comprising" and "consisting of".

In more general terms, in a first aspect, the invention relates to an electrolytic process for manufacturing hydrogen. The inventive process comprises the step of electrolysing a composition comprising water and hydrazine. This aspect of the invention shall be explained in further detail below:

The term "electrolytic process" is generally known and relates to a process where an electrolyte composition is subjected to an electric current (preferably DC) by means of electrodes (cathode and anode) to drive an otherwise non-spontaneous chemical reaction. Accordingly, key parameters of the inventive process are the selection of electrolyte composition, of electrodes and of process parameters.

Without being bound to theory, it is believed that the addition of hydrazine into pure water improves the electrolysis of water. Specifically, the process is much faster and economical when compared to processes where hydrazine is absent. This effect may be attributed to the exothermic decomposition of hydrazine into hydrogen and nitrogen. The electrolytic process as described herein is (a) faster (more hydrogen produced per time); (b) more productive (more hydrogen produced per unit); (c) more efficient (less energy consumption). This allows replacing current electrolytic processes and electrolyzers by the inventive electrolytic processes and electrolyzers. Thus, the invention provides for an improved electrolytic process for manufacturing hydrogen from water.

Electrolyte composition: As outlined above, the electrolyte composition comprises water and hydrazine. The amount of hydrazine may vary over a broad range, up to 98 wt. % hydrazine may be present in the electrolyte composition. Advantageously, the electrolyte composition comprises water and 0.5-50 wt. % hydrazine, preferably water and 5-50 wt. % hydrazine. In an alternative embodiment, the electrolyte composition comprises water and 0.5-5 wt. % hydrazine, preferably water and 0.5-3 wt. % hydrazine. Tests showed that low amounts of hydrazine, such as 3 wt. % only, gave excellent results. Such low amounts of hydrazine are also favourable from an economic perspective.

Thus, commercially available solutions of hydrazine in water may be used for the inventive process. Due to the specific weight of the above components, wt. % and vol. % relate to approximately the same values.

In one embodiment, the electrolyte contains further additives, preferably selected from group consisting of inorganic alkaline compounds, such as alkali hydroxides, e.g. potassium hydroxide (KOH). Potassium hydroxide was found to be particularly beneficial.

In one alternative embodiment, the electrolyte composition is free of, or essentially free of other components than water and hydrazine. Accordingly, the electrolyte composition may consist of water and hydrazine. This embodiment is particularly beneficial when using electrolyzers equipped with a diaphragm selected from the group of proton exchange membranes.

In a further embodiment, the electrolyte composition contains 0.5-3 wt. % hydrazine, 0-10 wt. % KOH (for example 0.2-5 wt. % KOH) and water.

Hydrazine: The term "hydrazine" relates to the chemical entity H2NNH2 and particularly includes the pure compound H2NNH2, the hydrazine hydrate H2NNH2*H2O and aqueous solutions of hydrazine, such as the commercially available solutions. Subjecting a solution comprising both, hydrazine and water, to an electrolytic process is considered a key feature of the present invention. For the avoidance of doubt, wt. % given in the context of hydrazine shall relate to the pure compound not to the hydrazine hydrate.

Hydrogen: As discussed above, the inventive process produces hydrogen as a main product. The term "hydrogen" relates to the chemical entity H2 and particularly denotes a gas comprising up to 100 vol % hydrogen, preferably 50-100 vol % hydrogen, particularly preferably 95-100 vol. % hydrogen. In the context of this invention, hydrogen contains no, or essentially no, carbon-containing gases (e.g. CO, CO2, CH4). In the context of this invention, the hydrogen as produced may contain other components, such as nitrogen (N2), ammonia (NH3) or oxygen (O2), depending on process parameters and electrolyzers used.

Electrodes: A wide variety of electrodes may be used in the inventive process. Electrodes known for water electrolysis are generally suitable in the inventive process. Electrode materials are known to influence electrolytic processes; plating of electrodes is a known method to optimize electrode materials. Suitable electrodes or electrode materials are known and/or commercially available. In one embodiment, the electrodes are made from titanium or its alloys or the electrodes are plated with titanium/titanium alloys.

Process parameters: Process parameters, including applied voltage, cell current, temperature, and pressure, may be varied over a broad range and determined by the skilled person in routine experiments. Suitable voltages applied may vary over a broad range, including from 2-480 Volt, preferably 12-240 Volt, such as 12-48 Volt. Alternatively, 100-120V; or 200-250V or 300-400V may be applied.

Suitable temperatures may vary over a broad range, typically from 0° C.-100° C., preferably 10° C.-60° C., such as 20° C.-40° C. Preferably, neither heating nor cooling is applied, resulting in a process run at ambient temperatures.

In an advantageous embodiment, the electrolytic process is run under alkaline conditions, i.e. at a pH above 7, preferably pH 7.5-13. Such conditions may be obtained by adding inorganic alkaline compounds, such as KOH.

In a second aspect, the invention relates to an electrolytic cell comprising an electrolyte composition as defined herein. This aspect of the invention shall be explained in further detail below:

As used herein, the term electrolytic cell, also known as electrolyzer, shall describe a device suitable for/adapted to performing an electrolytic process. For the avoidance of doubt, electrolytic cells differ from fuel cells: In electrolytic cells, a chemical reaction is effected by consuming electrical energy. In fuel cells, to the contrary, a chemical reaction takes place thereby producing electrical energy. Accordingly, an electrolytic cell comprises an electrolytic composition, a housing, a cathode, an anode, and optionally a diaphragm.

Electrolyte: The inventive electrolytic cells are characterised in that the electrolytic composition comprises water and hydrazine as described herein. The electrolytic composition is in fluid communication with the electrodes.

Housing: Housings for electrolytic cells are known per se; such housings are suitable for the inventive electrolytic cells. The housing comprises outlets for the products of the electrolysis, particularly for hydrogen. The housing may be adapted to separate gases formed on the cathode and on the anode. The housing further comprises an inlet for supply with electrolytic composition. The housing further accommodates the electrodes such that cathode and anode are separated from each other, in contact with the electrolyte composition and in contact with a source of electric power.

In one embodiment, the housing is connected to an internal combustion machine, such that the products of the electrolysis are fed to the internal combustion machine. Internal combustion machines particularly include diesel engines, as known in the field.

In one further embodiment, the housing is connected to a heating unit such that the products of the electrolysis are fed to the heating unit. Heating units particularly include natural gas heating units, as known in the field.

In one further embodiment, the housing is connected to a cooling unit, such that the products of the electrolysis are fed to the cooling unit.

In one further embodiment, the housing is connected to a compressor system, such that the products of the electrolysis are fed to the compressor system.

In one further embodiment, the housing is connected to an energy storage system, particularly wind energy storage systems and solar energy storage systems, such that the electrolyte composition is in contact with a source of electric power generated by an energy generating system.

Cathode: The cathode material may be selected from known cathode materials suitable for electrolysis of water; preferably an inert material, such as titanium or titanium alloys. The inventive cell may comprise one or more cathodes, preferably one cathode.

Anode: The anode material may be selected from known anode materials suitable for electrolysis of water; preferably an inert material, such as titanium or titanium alloys. The inventive cell may comprise one or more anodes, preferably one anode.

Diaphragm: Depending on the intended use and the specific design, the inventive electrolytic cell may also comprise a diaphragm. Such diaphragm may separate cathode from anode.

A diaphragm is a microporous material with average pores less than one micron. Diaphragms allow passage of either solvent from one chamber to other or electrical flow and passage of solute through the same. This process is commonly done by introducing a material which allows the passage of electricity and at the same time separating the anolyte (i.e. the zone of the anode) and catholyte (i.e. the zone of the cathode. As used herein, diaphragm shall include porous inorganic materials, woven or non-woven fabrics and membranes. Suitable diaphragms possess the following properties: i. low resistance, ii. good chemical and physical stability, iii. high resistance to diffusion of electrolytes between compartments except for transport of the desired current carrying ion and iv. low cost.

The skilled person is in a position to identify diaphragms suited to the inventive process. Suitable membranes are selected from the class of proton exchange membranes (PEMs). PEMs can be made from either pure polymer membranes or from composite membranes, where other materials are embedded in a polymer matrix. Suitable polymers for PEMs include polyaromatic polymers, partially fluorinated polymers and fully fluorinated polymers. By way of example, tetrafluorethylene-based polymers, brand name Nafion, are mentioned.

In an advantageous embodiment, the inventive electrolytic cell is characterised in that the housing is connected to, or connectable to, a storage vessel; said vessel comprising an electrolytic composition as defined herein.

In a further advantageous embodiment, the materials of cathode and anode of the electrolytic cell are from titanium or titanium alloys or plated with titanium or titanium alloys.

In a further advantageous embodiment, the electrolytic cell does not contain a diaphragm.

In a further advantageous embodiment, the electrolytic cell does contain a diaphragm. Advantageously, the diaphragm is selected from proton exchange membranes, such as tetrafluorethylene based proton exchange membranes. When using such electrolytic cell, the electrolyte may be free of alkali hydroxide.

In a third aspect, the invention relates to devices comprising electrolytic cells as described herein and to the corresponding uses of such electrolytic cells. This aspect of the invention shall be explained in further detail below:

As indicated above, the electrolytic process described herein produces hydrogen, particularly hydrogen free of carbonaceous material. Suitable devices for this process, electrolyzers, are described above. These inventive electrolyzers may replace known electrolyzers in known applications and as a result, be implemented in known devices. Accordingly, these known devices may comprise as one element the electrolyzers described herein.

According to this invention, any motorized application may be equipped with an electrolyzer as described herein. Such motorized application incudes any kind of transportation vehicle (including but not limited to motor vehicles, trains and aircrafts) and motorized industrial applications (including but not limited to heating systems, compressor systems, generator systems).

Motor vehicles: In one embodiment, the devices is a motor vehicle, such as a car, a truck or a bus. The invention therefore pertains to motor vehicles comprising one or more electrolyzers as described herein.

Trains: In one further embodiment, the devices is a rail-mounted vehicle, such as a railroad engine or a railroad car. The invention therefore pertains to railmounted vehicles comprising one or more electrolyzers as described herein.

Aircraft: In one embodiment, the device is an aircraft, such as a plane (including propeller-driven airplanes and jet planes), or a helicopter. The invention therefore pertains to aircrafts comprising one or more electrolyzers as described herein.

Vessels: In one embodiment, the device is an vessel, such as a boat. The invention therefore pertains to boats comprising one or more electrolyzers as described herein.

Heating Systems: In one further embodiment, the device is a heating and/or cooling system. The invention therefore pertains to heating systems, such as heaters or air-conditioning systems, comprising one or more electrolyzers as described herein.

Compressor Systems: In one further embodiment, the device is a compressor system. The invention therefore pertains to compressor systems, comprising one or more electrolyzers as described herein.

Energy Storage Systems: In one further embodiment, the device is an energy storage system. The invention therefore pertains to energy storage systems, comprising one or more electrolyzers as described herein. Energy storage systems become more and more important, particularly in the context of renewable energies. Solar plants or Wind parks may produce excess energy, not required at the moment of production. Such energy may be used to run an electrolytic process as described herein. The thereby obtained hydrogen may be easily stored and/or transported and finally converted to electricity once needed at a later point in time or at another location.

In a forth aspect, the invention relates to new uses of hydrazine and aqueous hydrazine compositions. This aspect of the invention shall be explained in further detail below:

As discussed above, hydrazine is a known substance and commercially available, with a multi-ton production each year, due to its many applications in chemical synthesis.

It is also known that hydrazine may decompose thermally, thereby forming nitrogen and hydrogen, or nitrogen and ammonia. This thermal decomposition may be catalysed by heterogeneous catalysts. Thermal decomposition of hydrazine is implemented in various devices, such as rocket engines.

It is further known that hydrazine is a reducing agent allowing the manufacturing of heterogeneous catalysts. Turchan et al (U.S. Pat. No. 4,761,270) also disclose a method of reducing NOx in fossil fuels combustion using hydrazine or hydrazine compounds. According to this document, hydrazine is directly injected in the fuel combustion reaction zone.

However, until now it was not known to use hydrazine as an electrolyte. Thus, the invention also relates to the use of hydrazine as an electrolyte, Advantageously, the invention relates to the use of hydrazine as an electrolyte in an electrolytic composition comprising water and hydrazine with up to 98 wt. % hydrazine. Accordingly, the invention pertains to the use of compositions described herein, $1^{st}$ aspect of the invention, as electrolytic compositions.

Advantageously, the invention relates to the use of aqueous hydrazine as an electrolyte in a electrolytic composition for manufacturing hydrogen.

It was also surprisingly found that aqueous hydrazine compositions as described herein may be used to improve combustion of hydrocarbons, such as natural gas, gasoline or diesel. A common drawback of internal combustion engines known today is their low efficiency. Particularly for diesel engines, soot formation is a known problem. Formation of soot indicates incomplete combustion and thus low efficiency. By subjecting an electrolytic composition as described herein (1$^{st}$ aspect) to an electrolytic process and providing the hydrogen obtained thereby to an internal combustion machine, such as a diesel engine, the combustion is generally improved and soot formation is reduced. Accordingly, the invention also provides for the use of a composition comprising water and hydrazine with up to 98 wt. % hydrazine as an additive to internal combustion engines, particularly as an additive to diesel engines.

Contrary to the prior art, the aqueous hydrazine solution is not used as a direct additive, i.e. it is not injected into the fuel combustion reaction zone. Rather, the aqueous hydrazine solution, particularly as described herein, is subjected to an electrolytic process, the reaction products thereof being fed to the fuel combustion reaction zone. Accordingly, the aqueous hydrazine solution, particularly as described herein, may be used as an indirect additive to fuel combustion processes. This use particularly relates to combustion processes of hydrocarbons, such as natural gas, gasoline or diesel.

Consequently, the invention pertains to the use of a composition comprising water and 0.5-50 wt. % hydrazine and having a pH of 7.5-13, as an additive to internal combustion engines, whereby said composition is first subjected to an electrolytic process and the thus resulting gaseous products are fed to an internal combustion engine.

To further illustrate the invention, the following examples is provided. These examples are provided with no intend to limit the scope of the invention.

EXAMPLE 1

Four conventional minibuses (Renault Traffic) were used for a field test. 3 Minibuses are equipped with an electrolyzer as described herein, the forth minibus was run with an electrolyzer, but water only. All minibuses were used on their daily routine under similar conditions. The electrolyzers cathode and anode are made of titanium, as electrolytic composition 500 ml of water and hydrazine (95:5 by volume for #1-3; 100:0 for #4) were used. The electrolyzer was connected to the minibuses battery to supply DC to the electrolyzer. The hydrogen obtained was fed to the engine.

The 500 ml electrolytic composition are sufficient for running the minibus approximately 1300 km. The following fuel consumptions were observed:

| Minibus # | total distance [km] | fuel consumption [km/litre diesel] |
| --- | --- | --- |
| inventive, with electrolyzer | | |
| #1 | 892 | 11.2 |
| #2 | 907 | 10.6 |
| #3 | 895 | 10.4 |
| average #1-#3 | | 10.7 |
| for comparison, with electrolyzer, water only | | |
| #4 | 484 | 7.6 |

As can be seen, the fuel consumption of the inventive minibuses (i.e. equipped with the electrolyzer) is clearly reduced over the conventional minibus (i.e. without electrolyzer). While the conventional minibus can run only 7.6 km with 1 litre of diesel (equiv. to 13.2 litres per 100 km), the inventive minibus can run approx. 10.7 km with 1 litre of diesel (equiv. to 9.3 litre per 100 km); this corresponds to an increased efficiency of about 50% (!).

In addition to the increased efficiency, an improved combustion was observed. The improved combustion could be easily observed by inspection of the exhaust system. While the inventive minibuses showed exhausts that were almost clean, the conventional minibuses showed the typical black appearance. This black appearance is assigned to soot formation well known for diesel engines.

EXAMPLE 2

Three conventional minibuses were used for a field test. All Minibuses are equipped with an electrolyzer as described herein. All minibuses were used on their daily routine under similar conditions. The electrolyzer was connected to the minibuses battery to supply DC to the electrolyzer. The hydrogen obtained was fed to the engine. The electrolyzers cathode and anode are made of titanium, only the electrolytic composition differs, as shown in the table below.

The following fuel consumptions were observed when using different electrolytes:

| Minibus # | inventive, electrolyte composition: Water + Hydrazine | for comparison, electrolyte composition: water only | for comparison, electrolyte composition: water + ammonia |
| --- | --- | --- | --- |
| #A | 8.1 l/100 km | 16.4 l/100 km | 16.2 l/100 km |
| #B | 7.9 l/100 km | 16.0 l/100 km | 16.0 l/100 km |
| #C | 7.5 l/100 km | 15.9 l/100 km | 15.9 l/100 km |

As can be seen, the fuel consumption of the inventive minibuses (i.e. run with an inventive electrolyte composition of water+hydrazine) is clearly reduced over the non-inventive minibus (i.e. run with electrolyte composition=water or run with electrolyte composition=water+ammonia). It is to be noted that the results are obtained in a field test under realistic conditions, not in a test facility. It is further noted that all test are reproducible and consistent.

Particularly surprising are the results obtained with non-inventive electrolyte composition=water+Ammonia. Compared to water only, the addition of ammonia has no influence on the result. In other words, while electrolyte composition=water and electrolyte composition=water+ammonia provide the same results, an electrolyte composition=water+hydrazine provides for a significant, and reproducible, reduction in fuel consumption. As can be seen, a reduction in fuel consumption of 50% (!) is obtained.

In addition to the increased efficiency, an improved combustion was observed again. The improved combustion could be easily observed by inspection of the exhaust system. While the inventive minibuses showed exhausts that were almost clean, the non-inventive electrolytes again showed the typical black appearance. This black appearance is assigned to soot formation well known for diesel engines.

EXAMPLE 3

A heating unit, originally designed for operation with natural gas (3000000 kcal capacity) was converted to be fuelled by hydrogen. Hydrogen was obtained from an electrolysis unit operating at 320-350 VDC with a 90 amps rectifier.

A) Water/Hydrazine: The unit was filled with an electrolyte composition containing distilled water and 2.5 wt % hydrazine. Around 120 l/min of hydrogen gas from an electrolysis unit was obtained. This resulted in an energy production of around 300000kcal form the converted heating unit.

B) Water only: When running the above described converted heating unit with the same set-up, but electrolyte composition containing distilled water only, 0% hydrazine, only ⅕ of the hydrogen gas output was observed in every trial compared to the set-up described above, A).

The results obtained in the example are summarized below:

| # | inventive, electrolyte composition: Water + Hydrazine 2.5 | for comparison, electrolyte composition: water only |
|---|---|---|
| H2 produced | | |
| $1^{st}$ run | 124 l/min | 25 l/min |
| $2^{nd}$ run | 127 l/min | 29 l/min |
| $3^{rd}$ run | 125 l/min | 24 l/min |
| energy produced | | |
| $1^{st}$ run | 304000 kcal | 57000 kcal |
| $2^{nd}$ run | 312000 kcal | 59000 kcal |
| $3^{rd}$ run | 305000 kcal | 57500 kcal |

As can be seen, the hydrogen production is increased by the factor 4-5, when replacing the electrolyte "water" with the inventive electrolyte composition "water+hydrazine".

Without being bound to theory, it is believed that the presence of hydrazine triggers the electrolytic process, since hydrazine decomposes exothermically, hence obtaining much more hydrogen and energy with the same time.

The invention claimed is:

1. An electrolytic process for manufacturing hydrogen from water, said process comprising the step of electrolysing a composition comprising water, hydrazine and potassium hydroxide wherein
   said composition comprises 0.5-5 wt. % hydrazine;
   said composition comprises up to 10 wt. % potassium hydroxide;
   a voltage of 12-240 V is applied to said composition; and
   cathode material and anode material being selected from titanium and its alloys or plated with titanium and its alloys.

2. The electrolytic process of claim 1, wherein said composition comprises 0.5-3 wt % hydrazine.

3. The electrolytic process of claim 1, wherein said compositions has a pH between 7.5-13.

4. The electrolytic process according to claim 1, wherein no diaphragm is present.

5. The electrolytic process according to claim 1, wherein a diaphragm is present.

6. The electrolytic process according to claim 5, wherein the diaphragm is a proton exchange membrane.

7. An electrolytic cell for manufacturing hydrogen from water comprising
   a housing,
   a cathode, the cathode material being selected from titanium and its alloys or plated with titanium and its alloys;
   an anode, the anode material being selected from titanium and its alloys or plated with titanium and its alloys;
   an electrolytic composition, the electrolytic composition comprising water, 0.5-5 wt. % hydrazine, up to 10 wt. % potassium hydroxide and has a pH between 7.5-13; and
   optionally a diaphragm,
   wherein the electrolytic cell is operable to decompose water to generate hydrogen gas.

8. The electrolytic cell according to claim 7, wherein
   the housing is connected to a storage vessel; said vessel comprising an aqueous hydrazine composition; and
   the housing is connected to an internal combustion machine, such that the products of the electrolysis are fed to the internal combustion machine.

9. The electrolytic cell according to claim 7, wherein a diaphragm is present, the diaphragm being selected from the group of proton exchange membranes (PEMs).

10. A device comprising the electrolytic cell according to claim 7, said device being selected from
    motor vehicles, particularly diesel fueled cars;
    aircrafts;
    trains;
    boats;
    cooling and heating systems;
    compressor systems;
    generator systems; and
    energy storage systems, particularly wind energy storage systems and solar energy storage systems.

11. A device comprising the electrolytic cell according to claim 9, said device being selected from
    motor vehicles, particularly diesel fueled cars;
    aircrafts;
    trains;
    boats;
    cooling and heating systems;
    compressor systems;
    generator systems; and
    energy storage systems, particularly wind energy storage systems and solar energy storage systems.

12. An internal combustion engine additive composition, the additive composition comprising water and 0.5-5 wt. % hydrazine and having a pH of 7.5-13, whereby said composition is first subjected to the electrolytic process of claim 1 and the thus resulting gaseous products are fed to an internal combustion engine.

* * * * *